United States Patent

Waybright

[15] 3,681,712

[45] Aug. 1, 1972

[54] VERTICAL SWEEP MULTIVIBRATOR HAVING FALSE TRIGGER PROTECTION

[72] Inventor: George Cleveland Waybright, Batavia, N.Y.

[73] Assignee: GTE Sylvania Incorporated

[22] Filed: April 10, 1970

[21] Appl. No.: 27,218

[52] U.S. Cl. ..........................331/145, 178/69.5 TV
[51] Int. Cl. ..............................................H03k 3/08
[58] Field of Search.......178/69.5 TV; 331/113, 145, 331/153, 149

[56] References Cited

UNITED STATES PATENTS 3,377,569 4/1968 Mothersole..................331/145

OTHER PUBLICATIONS

G. E. Square Wave Generator, Date Prior to 1959, pgs. 14, 15,

*Primary Examiner*—John Kominski
*Attorney*—Norman J. O'Malley, Robert E. Walrath, Thomas H. Buffton and Edward J. Coleman

[57] ABSTRACT

For a television receiver, a vertical sweep multivibrator of the type employing first and second interconnected amplifiers with vertical sync pulses capacitor-coupled across a diode in the cathode circuit of the first amplifier. A resistor connected across the sync pulse coupling capacitor provides both a discharge path for the coupling capacitor and a bias path for the diode during the vertical trace interval to reduce false triggering in response to noise and video peaks. A resistor connected between the diode and the cathode of the first amplifier degenerates the grid circuit of the first amplifier to reduce false triggering in response to any undesired horizontal feedback signals.

2 Claims, 1 Drawing Figure

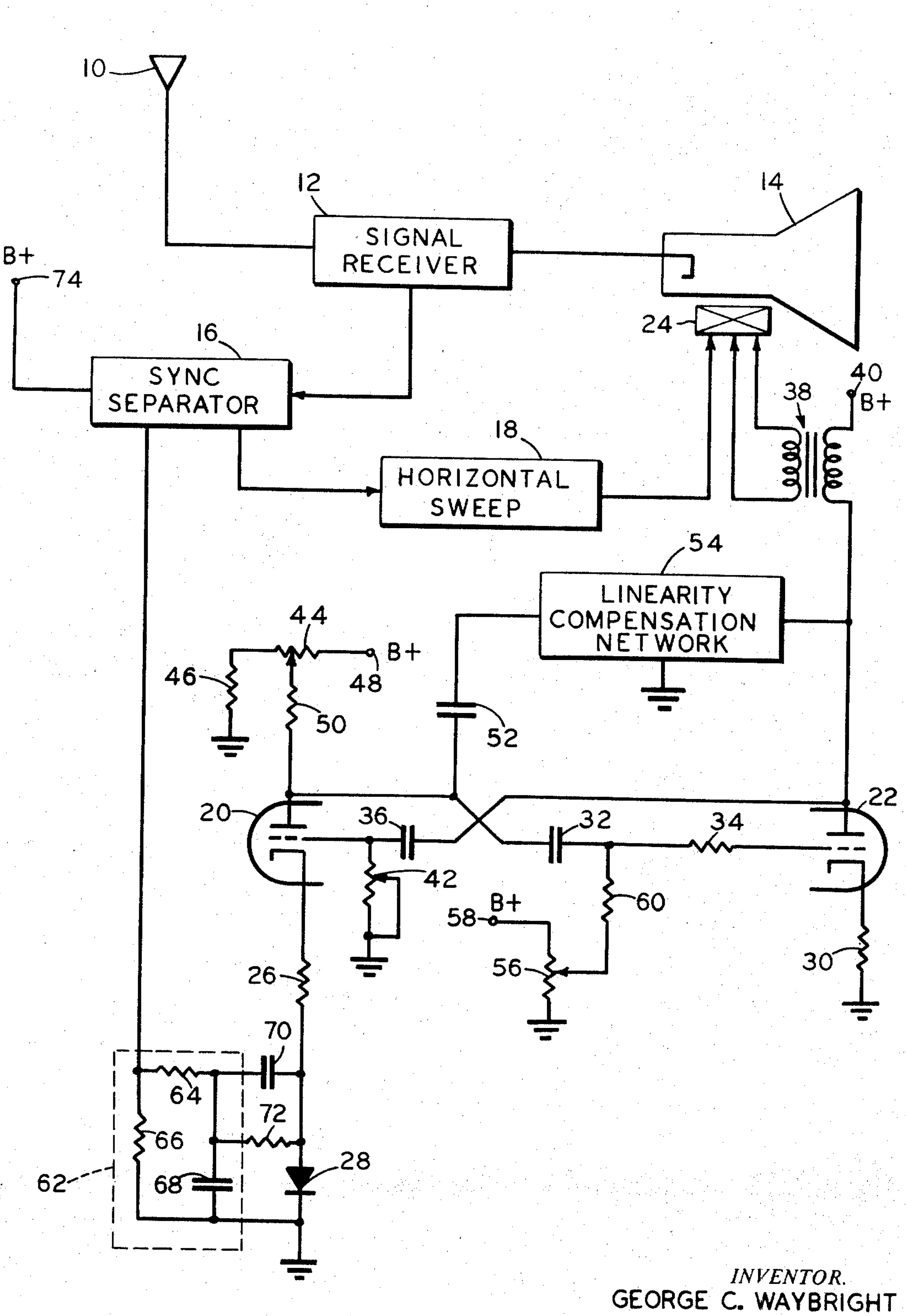
INVENTOR.
GEORGE C. WAYBRIGHT
BY Robert E. Walrath
ATTORNEY

VERTICAL SWEEP MULTIVIBRATOR HAVING FALSE TRIGGER PROTECTION

BACKGROUND OF THE INVENTION

This invention relates generally to multivibrator circuits and, more particularly, to a vertical sweep multivibrator synchronized by cathode-coupled sync pulses and having means for reducing false triggering.

In electronic apparatus, such as a television receiver, having a display device, such as a cathode-ray tube, in which an electron beam is scanned both vertically and horizontally over the face of the device to produce an image, the means for driving the vertical sweep of the beam is generally provided by a relaxation oscillator, such as a multivibrator or blocking oscillator, which is timed by transmitted synchronizing pulses. The present invention comprises an improvement of prior art vertical sweep multivibrators of the type having the received vertical synchronizing pulses coupled to the cathode of one of the multivibrator amplifiers. More particularly, the prior art multivibrator of interest comprises a pair of common cathode amplifiers each having its plate electrode coupled to the grid of the other amplifier. The cathode of a first one of the amplifiers is connected to ground through a diode, and the vertical synchronizing pulses separated from the received signal are applied across this diode. More specifically, negative-going vertical sync pulses are applied through an integrator having a first output connected to ground and a second output connected through a capacitor to the junction of the diode and the cathode of the first amplifier.

A capacitor connected to the grid of the first amplifier determines by its discharge time the interval during which the first amplifier is cut-off and the second amplifier is maintained conducting. During this period, the output of the second amplifier is transformer coupled to provide a vertical drive signal to beam deflection apparatus, such as a yoke on the neck of a cathode ray tube. This portion of the vertical drive is operative to cause a scanning beam to trace across the display tube face from top to bottom in a relatively slow manner.

When the grid timing capacitor is completely discharged, the first amplifier is rendered conducting so as to sharply cut off the second amplifier. The resulting rapid flux collapse in the second amplifier output transformer produces a high amplitude pulse which is fed back to the grid of the first amplifier. This feedback pulse rapidly charges the timing capacitor to a level causing cut off of the first amplifier. During the short interval that the first amplifier conducts, the scanning beam is rapidly retraced from the bottom to the top of the display tube face. Termination of the first amplifier conducting state by the charge on the timing capacitor causes the second amplifier to once again conduct and commence a new cycle.

The described free running operation of the multivibrator is synchronized with the received signal by the negative sync pulses applied to the cathode of the first amplifier. Each sync pulses triggers the retrace interval by forcing the first amplifier into conduction and thereby causing the second amplifier to be turned off.

A problem arises, however, in that the described circuit is quite susceptible to false triggering from a number of sources. For example, noise on weak received signals or peaks in the video signals may build up a charge on the sync coupling capacitor sufficient to trigger the first amplifier into conduction at an undesired time during the trace interval to cause tearing or jumping at the bottom of the picture on the display device. Further, cross talk in the beam deflection apparatus may cause the much higher frequency horizontal sweep signals to be fed back to the grid of the first amplifier in a manner causing mistriggering of a type resulting in poor interlace.

SUMMARY OF THE INVENTION

Accordingly, it is an object of the present invention to provide a synchronized multivibrator circuit having means tending to prevent false triggering.

It is another object of the invention to provide an improved vertical sweep multivibrator circuit synchronized by cathode coupled synchronizing pulses and having relatively simple and inexpensive means for protecting the circuit against a false triggering.

Briefly, these objects are attained in one aspect of the invention by a synchronized multivibrator circuit comprising first and second amplifiers each having control, output and reference electrodes, with means coupling the output of the first amplifier to the control electrode of the second amplifier and the output of the second amplifier to the control electrode of the first amplifier. The reference electrode of the first amplifier is connected through a diode to a source of reference potential, and a source of synchronizing pulses is coupled through a capacitor to the junction of the diode and the reference electrode of the first amplifier. Protection against false triggering of the first amplifier in response to signals other than synchronizing pulses applied to the capacitor is provided by means connected to that capacitor for enabling its discharge.

In another aspect of the invention, a degenerative circuit means is connected between the reference electrode of the first amplifier and the diode which tends to prevent false triggering of the first amplifier in response to undesired signals fed back from the output of the second amplifier to the control electrode of the first amplifier.

BRIEF DESCRIPTION OF THE DRAWING

This invention will be more fully described hereinafter in conjunction with the accompanying drawing, which shows a block diagram of a television receiver employing a vertical sweep multivibrator having false trigger protection in accordance with the invention.

DESCRIPTION OF THE PREFERRED EMBODIMENT

For a better understanding of the present invention, together with other and further objects, advantages and capabilities thereof, reference is made to the following disclosure and appended claims in connection with the above described drawing.

Referring to the drawing, there appears in block form the well known and conventional elements of a monochrome television receiver. These block elements are depicted only for the purpose of more clearly illustrating a particular embodiment of the present invention, which is illustrated schematically. The television receiver comprises an antenna 10 for intercepting transmitted television signals and coupling these intercepted signals to a signal receiver 12 including a tuner, an intermediate frequency channel, a sound channel, and video amplification and detection circuitry. The video output of the signal receiver is connected to the cathode electrode of a cathode ray tube display device 14, more commonly referred to as a picture tube. The video output of the signal receiver is also coupled to a sync separator circuit 16. Circuit 16 separates the synchronizing pulses from the video signals and applies these pulses to control the horizontal sweep circuitry, shown as block 18, and the vertical sweep circuitry, illustrated schematically as comprising a synchronized multivibrator circuit including triode amplifiers 20 and 22. The horizontal and vertical sweep circuits then operate to develop potentials suitable for application to electron beam deflection apparatus 24 associated with the picture tube 14 to cause both horizontal and vertical scanning of the viewing screen by an electron beam.

Referring to the schematically illustrated multivibrator circuit, the cathode of amplifier 20 serves as its reference electrode and is connected through a resistor 26 and diode 28 to a source of reference potential, represented by ground, the diode being oriented with its anode electrode connected to resistor 26 and its cathode electrode connected to ground. The cathode, or reference electrode, of amplifier 22 is connected to ground through a resistor 30. The plate electrodes function as the output terminals of each of the triode amplifiers, and the grids provide the control electrodes. Accordingly, as is typical of multivibrator circuits, the plate electrode of amplifier 20 is coupled through a capacitor 32 and resistor 34 to the control grid of amplifier 22, and the plate of amplifier 22 is coupled to the control grid of amplifier 20 through a timing capacitor 36. The output load for amplifier 22 comprises the primary winding of a vertical output transformer 38, the secondary winding of which is connected to deflection apparatus 24. One terminal of the vertical output transformer primary winding is connected directly to the plate electrode of amplifier 22, while the other terminal of the winding is connected to a source of positive direct current voltage (B+), represented by terminal 40.

The timing circuit for determining free running operation of the multivibrator is provided by an RC network comprising capacitor 36 and a variable resistor 42, which is connected between the grid of amplifier 20 and ground. Variable resistor 42 also enables control of the "vertical hold" function of the television receiver. The plate supply for amplifier 20 is provided by a circuit including a variable resistor 44 and fixed resistor 46 serially connected in that order between a B+ supply terminal 48 and ground, and a resistor 50 connected between the plate electrode of amplifier 20 and the variable tap on resistor 44. Also connected to the plate of amplifier 20 is one terminal of a "charge" capacitor 52, the other terminal of which is connected through a linearity compensation network 54 to the plate of amplifier 22. Capacitor 52 forms an RC network with resistors 50, 44 and 46 which cooperates with the linearity compensation network 54 control the linearity of the output wave form at transformer 38 when amplifier 22 is conducting and amplifier 20 is cut off. Accordingly, variation of the tap on resistor 44 enables control of the "vertical linearity" function of the television receiver. Linearity compensation network 54 is generally referenced to ground, as illustrated, and may be implemented in accordance with a variety of circuit configurations well known in the art.

The "vertical height" control function is provided by a circuit including a variable resistor 56 connected between a B+ supply terminal 58 and ground, and a resistor 60 connected between the variable tap on resistor 56 and the junction of capacitor 32 and resistor 34.

In free running operation, the discharge of capacitor 36 through resistor 42 determines the interval during which amplifier 20 is cut off and amplifier 22 is maintained conducting. During this period, the plate output of amplifier 22 is coupled via transformer 38 to provide a vertical drive signal to the beam deflection apparatus 24, which is operative to cause a scanning beam to trace across the face of the picture tube from top to bottom in a relatively slow manner.

When capacitor 36 is completely discharged or reaches a predetermined level of discharge, amplifier 20 is rendered conducting, whereupon the resulting abrupt drop in the plate voltage of amplifier 20 is operative by means of the coupling to the control grid of amplifier 22 to cause a sharp cut off of amplifier 22. As a result, the field in the vertical output transformer 38 rapidly collapses to produce a high amplitude pulse which is fed back via capacitor 36 to the control grid of amplifier 20. This feedback pulse rapidly charges timing capacitor 36 to a grid voltage level operative to cut off amplifier 20. During the short interval that amplifier 20 conducts, which is substantially determined by the duration of the feedback pulse applied to charge capacitor 36, the scanning beam in picture tube 14 is rapidly retraced from the bottom to the top of the display screen. Termination of amplifier 20 conduction by the charge on capacitor 36 increases the plate voltage coupled to the grid of amplifier 22 to once again cause amplifier 22 to conduct and commence a new cycle.

During the retrace interval when amplifier 20 is conducting, capacitor 52 is discharged; however, when amplifier 20 is cut off and amplifier 22 commences conduction during the trace interval, capacitor 52 is placed in a charging mode, whereby in cooperation with network 54 and resistors 50, 44 and 46, it functions to shape the vertical output waveform during the trace interval.

The free running duration of the trace interval, as established by timing capacitor 36 and resistor 42, is adjusted to be a little longer than the period between the received vertical sync pulses so that the multivibrator may be continuously triggered in response to the sync pulses to maintain synchronization with the received signal.

The vertical sync pulses are derived by applying one of the outputs of the sync separator 16 to an integrator circuit 62, comprising a series connected resistor 64, a parallel resistor 66 connected between the output of the sync separator and ground, and a parallel capacitor 68 connected between the opposite end of resistor 64 and ground. The output of the sync separator 16, which comprises horizontal, equalizing, and serrated vertical sync pulses is applied to the integrator at the junction of resistors 64 and 66. The horizontal and equalizing pulses are removed by the integrating action, and only the serrated vertical sync pulse is integrated to appear at the output of integrator 62 (the junction of resistor 64 and capacitor 68) as a negative going pulse. This integrated, negative-going vertical sync pulse is then applied to the cathode of amplifier 20, to trigger that amplifier into conduction, via a sync coupling capacitor 70 connected between the output of the source of synchronizing pulses, represented by the junction of resistor 64 and capacitor 68, and the anode terminal of diode 28. To complete the circuit in accordance with the invention, a discharge and bias resistor 72 is connected across the sync coupling capacitor 70.

In the absence of resistors 26 and 72, the operation of the synchronized multivibrator proceeds as follows. Application of a negative vertical sync pulse from integrator 62 via coupling capacitor 70 to the junction of diode 28 and the cathode of amplifier 20 momentarily causes diode 28 to become reverse biased and drives the cathode negative to thereby trigger amplifier 20 into conduction. Once conducting, the cathode potential of amplifier 20 will tend toward B+ and thereby forward bias diode 28 into heavy conduction. The resulting drop in the plate voltage of amplifier 20 when coupled to the control grid of amplifier 22 sharply cuts off amplifier 22, and the resulting output transformer flux collapse produces a feedback pulse for building up a charge on the grid timing capacitor 36. This represents the retrace interval.

Capacitor 36 charges during retrace to a sufficient level to bias amplifier 20 to cut off. The resulting increase in the plate voltage of amplifier 20 turns on amplifier 22 to begin the trace interval. During this trace interval, with amplifier 20 in a non-conducting state (and in the absence of resistor 72), diode 28 will be non-conducting so that the cathode of amplifier 20 will be floating, and coupling capacitor 70 will have no discharge path. In this condition, the presence of noise on weak received signals or peaks in the video signal which are coupled via the sync separator 16 and integrator 62 may build up a charge on capacitor 70. If this charge build up on the coupling capacitor becomes sufficiently negative, diode 28 will be reverse biased and amplifier 20 will be false triggered in an asynchronous manner during the trace interval. This type of false triggering results in a tearing or jumping of the picture at the bottom of the viewing screen of picture tube 14.

In the absence of resistor 26, another type of false triggering problem may arise. Before discussing this problem, however, the relevant aspects of a television transmission will be briefly reviewed. Under United States FCC standards for monochrome television transmission, one picture frame comprises 525 horizontal lines, and the frame frequency is 30 Hz. Each frame is divided into a first field, consisting of the first 262½ lines, and a second field, interlaced with the first field and consisting of the balance of 262½ lines to complete the frame total of 525 lines. Hence, the field frequency is 60 Hz. Each field comprises 247½ visible lines (the trace interval) followed by 15 lines used for vertical retrace from the bottom to the top of the picture. The vertical retrace interval is the portion of the composite video signal of particular interest relative to vertical synchronization.

The vertical sync pulse of the second field is displaced by one-half of a horizontal line with respect to that of the first field. To avoid loss of interlacing by a resulting half-line displacement of the long vertical sync pulse, equalizing pulses, having half the area and twice the rate of the horizontal sync pulses, are employed in the vertical blanking interval to make the signal identical for both fields in the region of the vertical sync pulse. This equalizing technique also results in the vertical sync pulse being broken up by six serrations. The time period of one horizontal line may be denoted by H. The horizontal sync pulse rate or frequency is 30 Hz times 525 lines = 15,750 Hz, and the vertical sync pulse rate is 60 Hz (the field rate.) Of particular interest, the horizontal sync pulse rate is one-half the rate of the vertical serrations; i.e. each vertical serration is one-half H.

Integration of the vertical serrations by circuit 62 results in the application to the cathode of amplifier 22 of a negative going stepped ramp waveform, each of the steps corresponding to a vertical serration. Under normal operating conditions, this negative, stepped ramp waveform is operative to trigger the vertical multivibrator in phase with the received horizontal sync pulses during every first field, and 180° out of phase with the horizontal sync pulses during every second field, to result in proper interlace.

If due to cross-talk in the deflection apparatus 24, however, horizontal sync pulses from the sweep circuit 18 are fed back via deflection apparatus 24 and output transformer 38 to the grid timing capacitor 36, the effect of horizontal pulses on the grid of amplifier 20 at the time that the integrated vertical sync pulse is applied to the cathode of amplifier 20 can cause false triggering of the multivibrator. Specifically, coincidence of the integrated serrated vertical sync pulse at the cathode of amplifier 20 with the presence of horizontal pulses at the grid electrode will result in amplifier 20 being triggered into conduction in phase with the horizontal pulses on every field. As a consequence, triggering of the multivibrator will be out of synchronization by at most one-half H every other field. The result is a degradation or complete loss of interlace.

In accordance with the present invention, a resistor 26 is connected between the cathode of amplifier 20 and the anode of diode 28. The value of this resistor is selected to degenerate the grid circuit so as to reduce the sensitivity of amplifier 20 to any undesired horizontal signals that might be fed back via grid timing capacitor 36. The degenerative circuit provided by resistor 26, therefore, tends to prevent false triggering of amplifier 20 in response to undesired horizontal signals fed back from the output load of amplifier 22 and thus maintain proper interlace.

A particular advantage of this mode of false trigger protection is that as the vertical sync pulse is fed into the cathode circuit below resistor 26 it will not be degenerated. In this manner, resistor 26 tends to further improve the ratio between the vertical synchronization injected in the cathode circuit and any horizontal sync pulses that might be on the grid circuit. The value of resistor 26 is not critical, although it should not be too large, whereby amplifier 20 would be made so degenerative that the multivibrator would be difficult to synchronize.

Protection against false triggering due to the build up of a charge on coupling capacitor 70 in response to noise or video peaks is provided, in accordance with the invention, by the connection of resistor 72 across capacitor 70. Resistor 72 thereby provides a discharge path for any charge built up on capacitor 70 during the trace interval and thus tends to prevent false triggering of amplifier 20 in response to signals applied to capacitor 70 other than the vertical synchronizing pulses. Further, as a source of B+ supply and bias voltage is connected to sync separator 16, as represented by B+ terminal 74, resistor 72 also provides a DC bias path for diode 28 to further enhance the false triggering protection. More specifically, this DC bias path extends from B+ terminal 74 through sync separator 16, resistor 64, and resistor 72 to the anode of diode 28. Resistor 72 is selected to have a relatively large resistance value sufficient to provide a very slight forward bias of the diode during the trace interval. In this manner, diode 28 provides a relatively high impedance path to ground during the trace interval to further diminish the effects of any charge build up on coupling capacitor 70 due to noise or video peaks. The selection of resistor 72 is not critical, although its resistance value should not be so low as to forward bias the diode to a degree causing excessive attenuation of the vertical sync pulses.

In operation, during the trace interval when amplifier 20 is cut off and amplifier 22 is conducting, resistor 72 functions to provide a discharge path for capacitor 70 and to bias diode 28 to a slightly forward conducting state whereby the diode provides a relatively large impedance to ground in the cathode circuit of amplifier 20. The combination of the discharge path and the forward conducting diode continuously counteracts any charge build up on coupling capacitor 70 due to extraneous signals received during the trace interval, such as noise or video peaks. Upon arrival of the integrated negative going vertical sync pulse however, both terminals of coupling capacitor 70 are momentarily driven to a negative value, thereby reverse biasing diode 28 and triggering amplifier 20 into conduction.

During the nearly instantaneous period that the vertical sync pulse is applied to the cathode of amplifier 20, resistor 26 will function to degenerate the grid circuit of amplifier 20 to thereby reduce sensitivity to any horizontal signals that may be fed back from the output circuit of amplifier 22 and thus tend to prevent a mistriggering causing degradation of interlace. As the vertical sync pulse is applied ahead of the degenerative resistor 26, however, the effectiveness of synchronization is not impaired.

Upon termination of the vertical sync pulse, the conducting state of amplifier 20, maintained by the discharged voltage level on timing capacitor 36, causes diode 28 to be biased to heavy forward conduction. The sharp cut off of amplifier 22 in response to conduction of amplifier 20 causes abrupt collapse of the flux field in the vertical output transformer with the resultant application of a high amplitude feedback pulse to timing capacitor 36. The balance of the conducting period of amplifier 20 is determined by the feedback induced charge rate of capacitor 36 and comprises by far a substantial portion of the retrace interval. With a predetermined level of charge on timing capacitor 36, amplifier 20 is biased to cut off and thereupon biases amplifier 22 into conduction to commence the trace interval. With amplifier 20 returned to a nonconducting state, the forward bias on diode 28 is substantially reduced to that provided via resistor 72. During the remainder of the trace interval, resistor 72 once again provides the discharge and bias functions necessary to substantially reduce the possibility of false triggering in response to noise or video peaks.

Resistors 26 and 72 both may be employed in a multivibrator circuit, as illustrated, to provide a complete form of false trigger protection, or each may be used separately where the application permits. That is, where the receiver design in which the multivibrator is used is such that there is little or no chance of the feedback of undesired signals from the output circuit of amplifier 22, discharge resistor 72 may be employed with the junction of capacitor 70 and diode 28 being connected directly to the cathode of amplifier 20, without the use of a degenerative resistance. Likewise, in applications in which the possibility of extraneous signals being passed through the synchronizing pulse source is quite remote, degenerative resistor 26 may be employed in the multivibrator circuit without the need for a discharge resistor 72. The invention is not limited to television applications, nor to the specific multivibrator circuit shown; for example, amplifier 22 may comprise a pentode; amplifiers 20 and 22 may be separate vacuum tubes rather than being enclosed in one tube envelope as illustrated; and amplifiers 20 and 22 may comprise transistors, with the output electrode of each amplifier being a collector rather than a plate, the control electrode being a transistor base rather than a vacuum tube control grid, and the reference electrode being an emitter rather than the cathode. Further, in lieu of being connected across capacitor 70, the function of discharge resistor 72 may also be provided by connecting that resistor from the junction of capacitor 70 and diode 28 to a separate source of bias voltage or to ground. Hence, although the invention has been described with respect to certain specific embodiments, it will be appreciated that modifications and changes may be made by those skilled in the art without departing from the true spirit and scope of the invention.

I claim:

1. A synchronized multivibrator circuit comprising, first and second amplifiers each having control, output and reference electrodes, means coupling the output electrode of said first amplifier to the control electrode of said second amplifier, a load connected to the output electrode of one of said first and second amplifiers, means coupling the output electrode of said second amplifier to the control electrode of said first amplifier, means connecting the reference electrode of said second amplifier to a source of reference potential, a diode having first and second terminals, means connecting the first terminal of said diode to the reference electrode of said first amplifier, means connecting the second terminal of said diode to said source of reference potential, a source of synchronizing pulse, an integrator circuit connected to said source of synchronizing pulses, a capacitor connected between said integrator circuit and the first terminal of said diode, and a resistor connected in parallel with said capacitor for enabling discharge of said capacitor in a manner tending to prevent false triggering of said first amplifier in response to signals applied to said capacitor other than synchronizing pulses and for providing a direct current bias path from said source of synchronizing pulses to said diode.

2. A multivibrator according to claim 1 wherein said means connecting the first terminal of said diode to the reference electrode of said first amplifier is a resistor for reducing the sensitivity of said first amplifier to undesired signals on the control electrode of said first amplifier.

* * * * *